Oct. 1, 1968 J. V. DE MARINIS ET AL 3,404,225

CIRCUITRY FOR ELECTRON DEVICES HAVING OUTPUT TO INPUT FEEDBACK SIGNAL COUPLING

Filed Oct. 21, 1965 2 Sheets-Sheet 1

INVENTORS
JOSEPH V. DEMARINIS &
C. BAILEY NEAL
BY
[signature]
ATTORNEY

INVENTORS
JOSEPH V. DEMARINIS &
C. BAILEY NEAL
BY
Robert E. Strauss
ATTORNEY

United States Patent Office 3,404,225
Patented Oct. 1, 1968

3,404,225

CIRCUITRY FOR ELECTRON DEVICES HAVING OUTPUT TO INPUT FEEDBACK SIGNAL COUPLING

Joseph V. De Marinis and Charles Bailey Neal, Batavia, N.Y., assignors to Sylvania Electric Products Inc., a corporation of Delaware Filed Oct. 21, 1965, Ser. No. 499,289
6 Claims. (Cl. 178—7.3)

ABSTRACT OF THE DISCLOSURE

A television receiver employs a triode keyed AGC tube with large amplitude keying pulses applied to the triode anode. A fraction of the keying pulse appears at the triode grid due to the relatively large inherent anode-to-grid capacitance of a triode. The portion of the keying pulse fed back to the grid produces deleterious effects on the operation of the AGC circuit and an associated sync separator circuit. These effects are minimized or eliminated by supplying to the triode grid an inverted keying pulse to cancel out the undesired keying pulse appearing at the grid.

This invention relates to television receivers and more particularly to improved circuitry adapted for use in automatic gain control (AGC) and synchronizing pulse separator systems employing an electron device having output to input electrode "feedback" signal coupling.

In television receiver circuitry, it is a common practice to employ both a keyed automatic gain control (AGC) and a synchronizing pulse separator system. In a keyed AGC system, a voltage pulse, available from a winding on the flyback transformer in the output circuit of the horizontal output stage, is applied to the output electrode of an electron device. At the same time, a synchronizing pulse included in a composite video signal is applied to the input electrode of the electron discharge device. The simultaneous arrival of the voltage pulse and synchronizing pulse signals causes conduction of and current flow in the (AGC) discharge device whereby a negative-going D.C. voltage, at a level dependent upon the signal applied to the input electrode, is developed in the output circuit of the device.

The synchronizing pulse separator system utilizes an electron device having an input and output electrode. The input electrode is coupled by way of an impedance to the input electrode of the AGC electron device and the input electrodes of both devices are coupled to a common source of composite signals including video and synchronizing pulse information.

One of the problems associated with such combined AGC and synchronizing pulse separating systems is that the relatively large amplitude keying pulse applied to the output electrode of the AGC electron device is coupled back through the device, usually in somewhat modified form and shape, to the input electrode thereof. Also, the "feedback" signal is coupled by way of the above-mentioned impedance to the input electrode of the synchronizing pulse separator electron device.

Since the amplitude of the synchronizing pulse signals applied to the input electrode of the AGC electron device is normally employed as a means for gauging the level of a received carrier signal and serves to determine the operation of the AGC system, it can readily be understood that the combining therewith of an undesired "feedback" signal whose magnitude is independent of the received signal has a deleterious effect upon the operation of the AGC system. Also, it can readily be understood that the combining of a synchronizing pulse signal and an undesired "feedback" signal causes an undesired modification in effective amplitude, width, and timing of the synchronizing pulse signal information applied to the synchronizing pulse separating device.

As a result, the operation of the synchronizing pulse separating device is adversely affected which, in turn, adversely affects the synchronizing pulse signal information available therefrom. Since the horizontal and automatic frequency control (AFC) and oscillator systems as well as the vertical oscillator system are coupled to and dependent upon the information received from the synchronizing pulse separating system, erroneous synchronizing pulse signal information has a deleterious effect upon the entire television receiver.

Moreover, as the strength of a received signal is decreased causing a decrease in the amplitude of the synchronizing pulses while the voltage pulse signal applied to the output electrode of the AGC device and the "feedback" signal coupled therethrough remain substantially unchanged, it is obvious that the undesired "feedback" signal assumes an even greater percentage of the total signal information applied to both the AGC and the synchronizing pulse separating devices. Thus, the horizontal scanning and vertical interlace systems are adversely affected which is detrimental to optimum television receiver operation.

One prior art technique for reducing the above-described undesirable "feedback" signal effect of which applicant is aware is the utilization in an AGC system of an electron device having negligible feedback coupling between the output and input electrodes. For example, a pentode-type electron tube is frequently employed in AGC systems because of the inherent negligible output to input electrode signal coupling characteristic. However, a pentode-type tube having negligible "feedback" signal coupling is not nearly as economical as an electron device having "feedback" coupling such as a triode-type tube for instance. Also, it has been found that the extensive use in present-day television receivers of envelopes containing a plurality of tube structures very often provides a required pentode-type structure as well as a non-required and readily available triode-type tube structure having signal "feedback" coupling.

In another system known to applicant, a keyed AGC system employs a triode-type tube having appreciable output to input electrode "feedback" signal coupling. However, in order to negate the deleterious effects of the "feedback" signal coupling, the flyback transformer is provided with an additional winding and a negative-going pulse signal is coupled via an impedance from the newly added transformer winding to the input electrode of the AGC tube and to the input electrode of the synchronizing pulse separating tube. Obviously, the cost as well as the availability of such specialized transformers leaves much to be desired.

Therefore, it is an object of this invention to provide improved circuitry utilizing an electron device having output to input electrode "feedback" signal coupling and adapted for use in a television receiver.

Another object of the invention is to provide improved circuitry utilizing an electron device having output to input electrode "feedback" signal coupling and adapted for use in the automatic gain control (AGC) and synchronizing pulse separator systems of a television receiver.

Still another object of the invention is to provide improved television receiver circuitry substantially cancelling the effects of the output to input electrode "feedback" signal coupling in an electron device.

A further object of the invention is to simplify and economically provide reliable and efficient automatic gain control (AGC) and synchronizing pulse separator circuitry adapted for use in a television receiver.

These and other objects are achieved in one aspect of the invention by television receiver circuitry employing an electron device having an output and an input electrode and "feedback" signal coupling from the output to the input electrodes. A voltage pulse signal applied from a source to the output electrode of the electron device appears as a "feedback" signal at the input electrode and this "feedback" signal is substantially cancelled by coupling a voltage pulse signal from the same source through a phase inversion means to the input electrode.

For a better understanding of the present invention, together with other and further objects, advantages, and capabilities thereof, reference is made to the following disclosure and appended claims in connection with the accompanying drawings in which:

Figure 3:
Figure 4:
Figure 5:
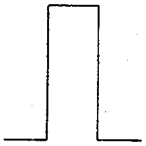
Figure 7:
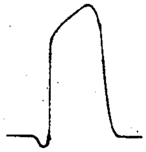
Figure 6:
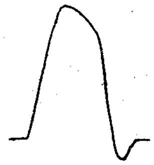
Figure 8:
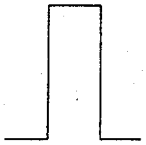
Figure 9:
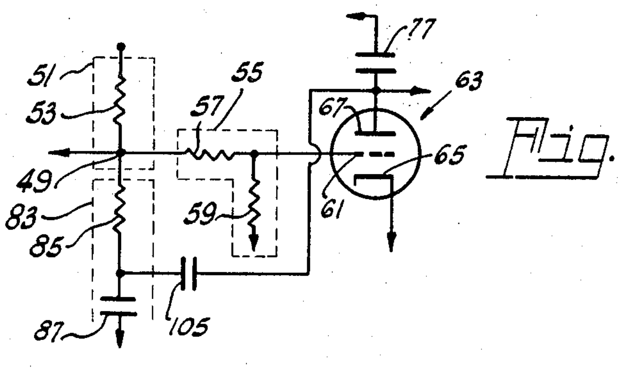

FIG. 3 graphically illustrates a modified "feedback" signal wave form appearing at the input electrode of an electron device having "feedback" signal coupling;

FIG. 4 graphically illustrates the wave form of FIG. 3 reduced in magnitude by an impedance coupling;

FIG. 5 is a graphic illustration of a synchronizing pulse signal available in a television receiver prior to the combining thereof with the reduced "feedback" signal of FIG. 4;

FIG. 6 graphically illustrates a resultant combined synchronizing pulse and "feedback" pulse signal combination prior to the addition of a voltage pulse signal;

FIG. 7 illustrates the combining of a synchronizing pulse signal and a voltage pulse signal;

FIG. 8 is substantially identical to FIG. 5 and illustrates the synchronizing pulse signal available to the synchronizing pulse separator electron device after cancellation of a "feedback" signal; and FIG. 9 is an alternate embodiment of an improved automatic gain control (AGC) and synchronizing pulse separator circuit for a television receiver.

Figure 1:
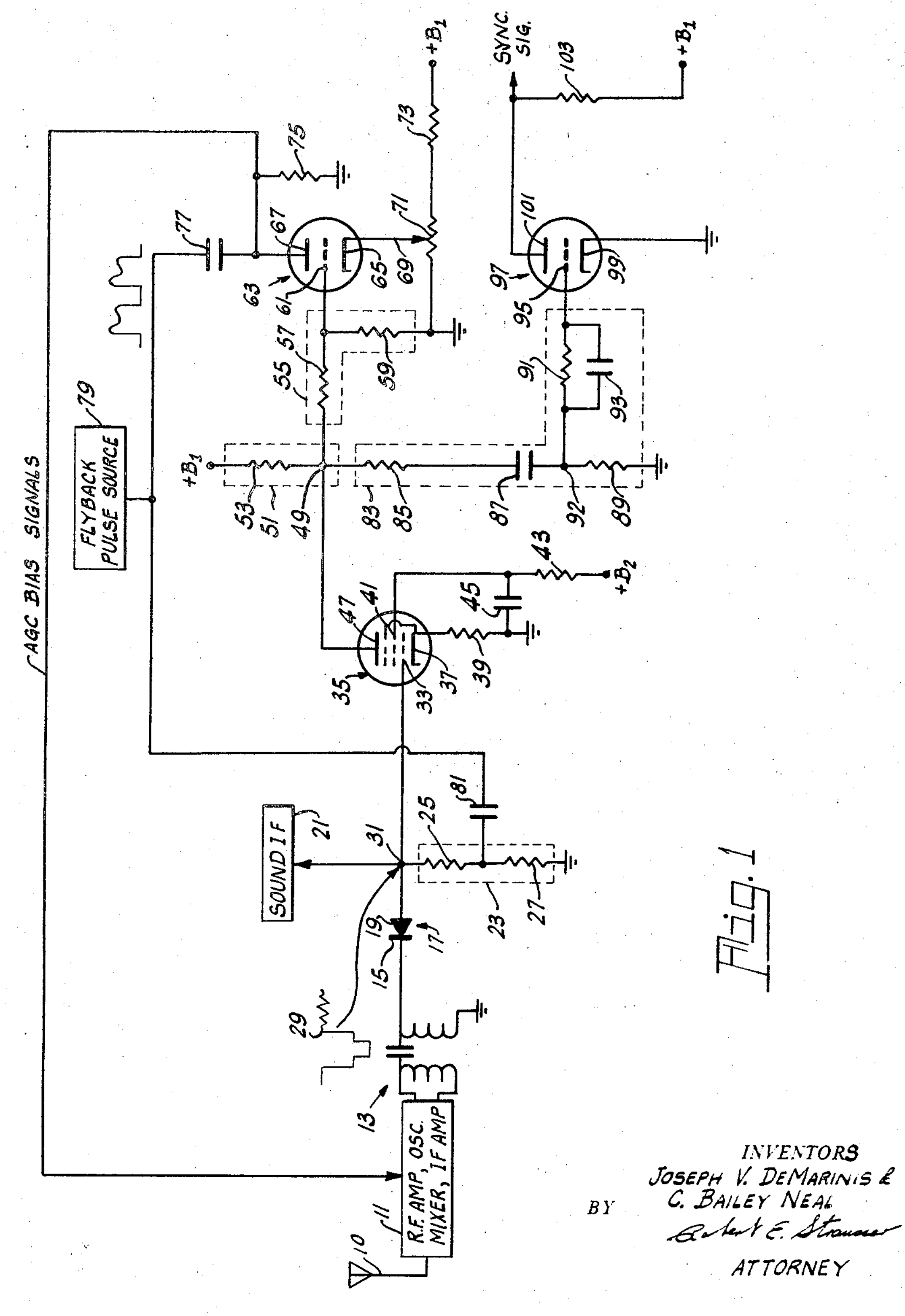
FIG. 1 is a schematic illustration of a portion of a television receiver including one embodiment of the invention.

Referring to FIG. 1 of the drawings, one embodiment of the invention is illustrated in association with that portion of a television receiver concerned with the invention. The receiver includes the usual antenna 10, and a block 11 illustrative of the well-known RF amplifiers, oscillator-mixer, and IF amplifiers commonly employed for intercepting a composite radio frequency television signal and converting the signal to an intermediate frequency signal.

An intermediate frequency composite signal available at the output transformer 13 is applied to the cathode 15 of a video detector 17 having an anode 19 directly connected to a sound intermediate frequency amplifying channel 21 and to a load circuit 23 which includes a pair of series connected resistors 25 and 27 coupled to circuit ground. A detected composite video signal 29 having a negative-going polarity available at the junction 31 of the anode 19 and load circuit 23 is applied to the control electrode 33 of a video amplifier tube 35. The amplifier tube 35 includes a cathode 37 coupled to circuit ground by way of a bias developing resistor 39, a screen grid electrode 41 coupled to a voltage source $+B_2$ via a resistor 43 and to circuit ground by a by-pass capacitor 45, and an anode 47 connected to a jointure 49 of a load circuit 51 which includes a load resistor 53 coupled to a voltage source $+B_1$.

A signal developed across the load circuit 51 and available at the jointure 49 is coupled via a first coupling network 55 which includes resistors 57 and 59 to circuit ground and to the input electrode 61 of an automatic gain control (AGC) electron device 63. The electron device 63 has an electron source 65 and an output electrode 67. The source 65 is coupled via an alterable arm 69 to a variable resistor 71 series connected to a fixed resistor 73 intermediate a source $+B_1$ and circuit ground. The output electrode 67 is connected to circuit ground via a load resistor 75 whereacross an AGC bias signal is developed and coupled back to the RF and IF amplifiers, block 11. Also, the output electrode 67 is coupled via a capacitor 77 to a flyback pulse voltage signal source 79. This pulse voltage signal source 79 is also coupled via a capacitor 81 to the jointure of the series connected resistors 25 and 27 of the video detector load circuit 23.

Additionally a second coupling network 83 includes series connected resistor 85, capacitor 87, and resistor 89 coupled from the jointure 49 to circuit ground and resistor 91 shunted by capacitor 93 coupled from a point 92 to the input electrode 95 of a synchronizing pulse separator electron device 97. The electron device 97 includes an electron source 99 connected directly to circuit ground and an output electrode 101 coupled to a voltage source $+B_1$ via a load resistor 103 whereacross is developed separated synchronizing pulse signals available for application to the horizontal oscillator system via the automatic frequency control (AFC) system as well as to the vertical oscillator system normally present in a television receiver.

As to the normal operation of a television receiver utilizing an electron device having output to input electrode "feedback" signal coupling, reference is made to the circuitry of FIG. 1 in conjunction with the graphic wave form illustrations of FIGS. 2, 3, 4, and 5. It can be readily understood that the application of a positive-going voltage pulse signal, FIG. 2, to the output electrode 67 of an electron device 63 having "feedback" signal coupling would result in the appearance of a "feedback" signal, FIG. 3, of modified shape and form, at the input electrode 61. This "feedback" signal FIG. 3 would also appear at reduced magnitude FIG. 4 due to the first coupling network 55, at the junction 49.

In the well-known manner, a negative-going composite signal, 29 of FIG. 1, including video, blanking, and synchronizing pulse signals is available at the output of the video detector 17. This negative-going signal is applied to the video amplifier 35 wherein phase inversion and amplification occurs to provide a positive-going synchronizing pulse signal FIG. 5 at the junction 49. Thereat, the positive-going synchronizing pulse signal FIG. 5 and the positive-going "feedback" signal of reduced magnitude FIG. 4 are combined to provide an activating signal FIG. 6 for application via the second coupling network 83 to the input electrode 95 of the synchronizing pulse separator electron device 97.

It is obvious that the resultant activating signal, FIG. 6, would have neither the desired width, amplitude nor timing of the synchronizing pulse signal, FIG. 5, and would have a deleterious effect upon the operation of the synchronizing pulse separator electron device 97 as well as the circuitry dependent thereon. Also, it can be readily understood that a decrease in the amplitude of the synchronizing pulse signal due to a decrease in the strength of a received signal combined with a "feedback" signal which is relatively constant and independent of the received signal strength would result in an activating signal wherein the "feedback" signal became an increased percentage of the total signal strength. Moreover, the "feedback" signal, FIG. 3, at the input electrode 61 of the electron device 63 would provide erroneous information and cause a deterioration of an automatic gain control (AGC) system.

Figure 2:
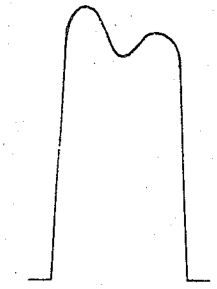
FIG. 2 is a graphic illustration of the signal wave form available from a voltage pulse source in a television receiver.

However, by applying the same positive-going pulse voltage signal, FIG. 2, by way of a capacitor 81 and load circuit 23, constructed in the form of a signal dividing network whereat is available a negative-going synchronizing pulse signal, there is provided a combined voltage pulse and synchronizing pulse signal. This combined signal is applied to the video amplifier 35 wherein the usual phase inversion and amplification occurs and then to the junction 49 in a form substantially as illustrated in FIG. 7.

As previously mentioned, a "feedback" signal FIG. 4 appears at the junction 49 via the coupling network 55 due to the "feedback" coupling of the electron device 63. Thus, a proper selection of component values for the capacitor 81 and the resistors 25 and 27 in conjunction with the amplification of the amplifier 35 permits the development of an oppositely phased voltage pulse signal of substantially the same magnitude as the "feedback" signal at the junction 49. Thereupon, the undesired "feedback" signal, FIG. 3, is substantially neutralized or cancelled and a synchronizing pulse signal, FIG. 8, of a form and amplitude similar to the original synchronizing pulse signal, FIG. 5, is available at the junction 49 and applied via the second coupling network 83 to the input electrode 95 of the synchronizing pulse separator electron device 97.

The above-described circuitry virtually eliminates the more important deleterious effects of "feedback" signal coupling with respect to the synchronizing pulse separator electron device 97 and reduces the effects thereof upon the AGC system. However, there would remain a small effect on the AGC system due to the magnitude of the "feedback" signal at the input electrode 61 as compared with the reduced value of "feedback" signal appearing at the junction 49.

In an alternate embodiment, illustrated in FIG. 9, virtual cancellation of the "feedback" signal effects on both the synchronizing pulse separator and AGC systems is provided. In addition to the coupling of a voltage pulse signal from the source 79 to the output electrode 67 of the AGC electron device 63 and to the load circuit 23 as previously described with respect to FIG. 1, a portion of the voltage pulse signal is coupled by way of a capacitor 105, FIG. 9, from the anode output electrode 67 of the AGC electron device 63 to a jointure 107 intermediate the series connected resistor 85 and capacitor 87 of the second coupling network 83.

In this manner, there is provided a "positive-going" pulse voltage signal, somewhat modified in form, of substantially similar magnitude at the input electrodes 61 and 95 of the AGC and synchronizing pulse separator electron devices, 63 and 97 respectively. Then, a proper selection of the ohmic value of the resistors 25 and 27 of the load circuit 23 of FIG. 1 and the capacitor 81 provides an activating signal at the input electrodes 61 and 95 of both the AGC and synchronizing pulse separator electron devices 63 and 97 which includes a signal portion of substantially equal magnitude and opposite in phase to the above-mentioned positive-going pulse voltage signal. Thus, the "feedback" signal effects are virtually eliminated in both the AGC and synchronizing pulse separator systems.

The following component values are illustrative of but in no way limiting to the circuitry of FIGS. 1 and 9:

| | | |
|---|---|---|
| Capacitor: | | |
| **77** | μf | 0.01 |
| **81** | μμf | 4.7 |
| **87** | μμf | 6.8 |
| **93** | μμf | 680 |
| **105** | | |
| Resistors: | | |
| **25** | | 10KΩ |
| **27** | | 120Ω |
| **57** | | 27KΩ |
| **59** | | 56KΩ |
| **85** | | 5.6KΩ |
| **89** | | 1.0MΩ |
| Electron Device: | | |
| **35** | | ½ 6GH8A |
| **63** | | ½ 6JT8 |
| **97** | | ½ 6GH8A |
| Operating Voltage: | | Volts |
| $+B_1$ | | 270 |
| $+B_2$ | | 140 |

While there has been shown and described what is at present considered the preferred embodiments of the invention, it will be obvious to those skilled in the art that various changes and modifications may be made therein without departing from the invention as defined by the appended claims.

What is claimed is:

1. In a television receiver having synchronizing pulse signals and employing an electron device having "feedback" signal coupling deleteriously affecting the synchronizing pulse signals, an electrical circuit substantially neutralizing the effects of the "feedback" signal on the synchronizing pulse signals comprising in combination:
- a source of composite signals including video and synchronizing pulse signals;
- a source of voltage pulse signals, said signals occurring in synchronization with the synchronizing pulse signals;
- an electron device including an input electrode, an output electrode, and "feedback" signal coupling from the output to the input electrodes;
- means coupling a voltage pulse signal from said source to the output electrode of said electron device;
- phase inversion means;
- means including a signal divider network coupling a signal from said voltage pulse source to said composite signal source to provide a combined composite and voltage pulse signal;
- means for applying said combined composite and voltage pulse signal to said phase inversion means; and
- means coupling a phase inverted combined composite and voltage pulse signal from said phase inversion means to the input electrode of said electron device, said voltage pulse signal from said phase inversion means being of substantially equal amplitude and in phase opposition to a "feedback" signal appearing at the input electrode of said electron device.

2. In a television receiver having synchronizing pulse signals and employing an electron device having "feedback" signal coupling deleteriously affecting the synchronizing pulse signals, an electrical circuit substantially neutralizing the effects of the "feedback" signal on the synchronizing pulse signals comprising in combination:
- a source of composite signals including video and synchronizing pulse signals;
- a source of voltage pulse signals, said signals occurring in synchronization with the synchronizing pulse signals;
- an electron device including an input electrode, an output electrode, and "feedback" signal coupling from the output to the input electrodes;
- circuit means coupling said composite signal source to the input electrode of said electron device, said means including a series connected signal phase inversion means and an impedance network; and
- means for coupling a voltage pulse signal from said source to the signal output electrode of said electron device and to a circuit junction intermediate said composite signal source and said phase inversion means whereby a "feedback" signal from the electron device appearing at the junction of the phase inversion and impedance network is substantially cancelled by a voltage pulse signal combined with said synchronizing pulse signals and in phase opposition to said "feedback" signal.

3. In a television receiver having synchronizing pulse signals and employing an electron device having "feedback" signal coupling deleteriously affecting the synchronizing pulse signals, an electrical circuit substantailly neutralizing the effects of the "feedback" signal on the synchronizing pulse signals comprising in combination:
- a source of composite signals including video and synchronizing pulse signals;
- a source of voltage pulse signals, said signals occurring in synchronization with the synchronizing pulse signals;

an electron device including an input electrode, an output electrode, and "feedback" signal coupling from the output to the input electrodes;

circuit means coupling said composite signal source to the input electrode of said electron device, said means including a series connected signal phase inversion means and an impedance network; and means coupling a voltage pulse signal from said source to the output electrode of said device and to a circuit junction intermediate said composite signal source and said phase inversion means, said means including a series connected capacitor and signal dividing network whereby a "feedback" signal appearing at the jointure of the phase inversion and impedance network is substantially cancelled by a voltage pulse signal of substantially equal amplitude and opposite phase.

4. In a television receiver employing an electron device having "feedback" signal coupling, an electrical circuit substantially cancelling the effects of the "feedback" signal coupling comprising in combination:

a source of composite signals including video and synchronizing pulse signals;

a source of voltage pulse signals, said signal occurring substantially in synchronization with the synchronizing pulse signals;

an AGC electron device having "feedback" signal coupling and a synchronizing pulse separator electron device each having an input and an output electrode;

a first and second series connected coupling network coupling the input electrodes of said AGC and synchronizing pulse separator electron devices;

phase inversion means;

means including a capacitor and a signal divider network for combining composite and voltage pulse signals from said sources and applying said combined signals to said phase inversion means;

means coupling phase inverted combined composite and voltage pulse signals from said phase inverter means to the jointure of said first and second coupling networks;

means for applying a voltage pulse signal from said source to the output electrode of said AGC electron device; and means coupling a synchronizing pulse signal from the jointure of said first and second coupling networks to the input electrode of said synchronizing pulse separator electron device.

5. In a television receiver employing an electron device having "feedback" signal coupling, a circuit substantially cancelling the effects of the "feedback" signal coupling comprising in combination:

a source of composite signals;

a source of voltage pulse signals;

phase inversion means;

means including a signal dividing network combining signals from said composite and voltage pulse signal sources and applying said combined signals to said phase inversion means;

an AGC and a synchronizing pulse separator electron device each having an input electrode, an output electrode and a coupling network connected to the input electrode, said coupling networks being series connected;

means coupling a voltage pulse signal from said source to the output electrode of said AGC electron device and to said coupling network connected to said synchronizing pulse separator electron device; and means coupling combined phase inverted composite and voltage pulse signals from said phase inversion means to the junction of said series connected coupling networks.

6. In a television receiver employing an electron device having "feedback" signal coupling, an electrical circuit substantially cancelling the effects of the "feedback" signal coupling comprising in combination:

a source of composite signals including video and synchronizing pulse signals;

a source of voltage pulse signals, said signals occurring substantially in synchronization with said synchronizing pulse signals;

a first and second electron device each having an input and an output electrode;

a first coupling network connected to the input electrode of said first electron device;

a second coupling network connected to the input electrode of said second electron device and to said first coupling network;

circuit means for applying a signal from said voltage pulse source to the output electrode of said first electron device and to the second coupling network;

means for combining a signal from said voltage pulse source and said composite signal source;

phase inversion means;

means for applying said combined signal from said voltage pulse and composite signal sources to said phase inversion means; and means for applying a phase inverted combined voltage pulse and composite signal from said phase inversion means to the jointure of said first and second coupling networks, said voltage pulse of said combined signal having a substantially equal amplitude and opposite phase to a "feedback" signal appearing at the grid electrode of said first electron device and to a "feedback" and voltage pulse signal appearing at the input electrode of said second electron device.

References Cited

UNITED STATES PATENTS 3,305,637 2/1967 Loughlin et al. ------- 178—7.5

ROBERT L. GRIFFIN, *Primary Examiner.*

R. L. RICHARDSON, *Assistant Examiner.*